(12) United States Patent
Orstad

(10) Patent No.: US 10,781,966 B2
(45) Date of Patent: Sep. 22, 2020

(54) EXTENDABLE, LOAD-BEARING STRUCTURE AND A METHOD FOR ERECTING AN EXTENDABLE, LOAD-BEARING STRUCTURE

(71) Applicant: Leif Invest AS, Kleppe (NO)

(72) Inventor: Leif Orstad, Kleppe (NO)

(73) Assignee: Leif Invest AS, Kleppe (NO)

( * ) Notice: Subject to any disclaimer, the term of this patent is extended or adjusted under 35 U.S.C. 154(b) by 0 days.

(21) Appl. No.: 16/300,318

(22) PCT Filed: May 16, 2017

(86) PCT No.: PCT/NO2017/050120
§ 371 (c)(1),
(2) Date: Nov. 9, 2018

(87) PCT Pub. No.: WO2017/200387
PCT Pub. Date: Nov. 23, 2017

(65) Prior Publication Data
US 2019/0113172 A1      Apr. 18, 2019

(30) Foreign Application Priority Data
May 19, 2016   (NO) .................................. 20160847

(51) Int. Cl.
*F16M 11/38*      (2006.01)
*B66F 7/06*       (2006.01)
(Continued)

(52) U.S. Cl.
CPC ............... *F16M 11/38* (2013.01); *A47B 9/16* (2013.01); *B66F 7/06* (2013.01); *B66F 7/0666* (2013.01);
(Continued)

(58) Field of Classification Search
CPC ...... F16M 11/38; F16M 11/18; F16M 11/048; F16M 2200/021; F16M 2200/061;
(Continued)

(56) References Cited

U.S. PATENT DOCUMENTS 188,266 A  *  3/1877  Stead ........................ E06C 5/28
                                                   182/69.3
999,126 A  *  7/1911  Sistermann ........... B66F 11/042
                                                   182/69.5
(Continued)

FOREIGN PATENT DOCUMENTS

CL            50889         1/2011
CL            52859         1/2013
(Continued)

OTHER PUBLICATIONS

Norwegian Search Report, Norwegian Patent Application No. 20160847, report dated Dec. 12, 2016.
(Continued)

*Primary Examiner* — Christopher Garft
(74) *Attorney, Agent, or Firm* — Andrus Intellectual Property Law, LLP

(57) ABSTRACT

An extendable, load-bearing structure has a main structure and a driving element. The main structure has at least one driving arm. The driving element is placed in connection with the driving arm to drive the extendable, load-bearing structure between first and second positions. The extendable, load-bearing structure has a lock mechanism, and a supporting structure. The supporting structure has at least one supporting arm that is shorter than the driving arm of the main structure. The supporting arm has at least two supporting-arm elements which are connected to each other by joints. The supporting-arm elements of the supporting arm are substantially in line when the extendable, load-bearing structure is in its second position. The lock mechanism is (Continued)

arranged to releasably lock the supporting-arm elements of the supporting arm in position when these are in line.

9 Claims, 5 Drawing Sheets

(51) Int. Cl.
  *B66F 11/04* (2006.01)
  *F16M 11/18* (2006.01)
  *A47B 9/16* (2006.01)
(52) U.S. Cl.
  CPC ............. *B66F 11/04* (2013.01); *F16M 11/18* (2013.01); *F16M 2200/021* (2013.01); *F16M 2200/061* (2013.01)
(58) Field of Classification Search
  CPC . A47B 9/16; B66F 7/06; B66F 7/0666; B66F 11/04; B66F 11/042; B66F 3/22; B60N 2/508; E06C 5/28
  See application file for complete search history.

(56) References Cited

U.S. PATENT DOCUMENTS

| | | | |
|---|---|---|---|
| 3,034,765 A * | 5/1962 | Ludowici | B66F 7/08 254/122 |
| 3,152,347 A | 10/1964 | Williams | |
| 3,162,317 A | 12/1964 | Becker | |
| 3,701,226 A * | 10/1972 | Fulcher | B66F 3/22 52/109 |
| 4,170,182 A * | 10/1979 | Button | B62B 3/02 108/106 |
| 5,285,992 A | 2/1994 | Brown | |
| 2012/0181735 A1 | 7/2012 | Ooe | |

FOREIGN PATENT DOCUMENTS

| | | |
|---|---|---|
| CN | 2130167 | 4/1993 |
| CN | 1264773 | 8/2000 |
| CN | 103241498 | 8/2013 |
| CN | 103442897 | 12/2013 |
| GB | 319486 | 9/1929 |
| GB | 726658 | 3/1955 |
| GB | 879098 | 10/1961 |
| SU | 1087459 | 4/1984 |
| WO | 2015/060063 | 4/2015 |

OTHER PUBLICATIONS

International Search Report, PCT/NO2017/050120, report dated Jul. 25, 2017.
Written Opinion and Reply, PCT/NO2017/050120, report dated Jul. 25, 2017.
Written Opinion, PCT/NO2017/050120, report dated Jun. 14, 2018.
International Preliminary Report on Patentability, PCT/NO2017/050120, report dated Aug. 8, 2018.

* cited by examiner

EXTENDABLE, LOAD-BEARING STRUCTURE AND A METHOD FOR ERECTING AN EXTENDABLE, LOAD-BEARING STRUCTURE

CROSS-REFERENCE TO RELATED APPLICATIONS

This application is the U.S. national stage application of International Application PCT/NO2017/050120, filed May 16, 2017, which international application was published on Nov. 23, 2017, as International Publication WO 2017/200387 in the English language. The International Application claims priority of Norwegian Patent Application No. 20160847, filed May 19, 2016. The international application and Norwegian application are both incorporated herein by reference, in entirety.

FIELD

The present invention relates to an extendable, load-bearing structure that includes a main structure and a driving element. The extent of the extendable, load-bearing structure is arranged to be changeable in both directions between a first position, in which the extendable, load-bearing structure has a smallest extent, and a second position, in which the extendable, load-bearing structure has a largest extent. The main structure includes at least one driving arm. The driving element is placed in connection with the at least one driving arm to drive the extendable, load-bearing structure between said positions. The invention further includes a method for erecting an extendable, load-bearing structure.

BACKGROUND

Extendable structures are known from before, for example for use in lifts and so-called "scissor tables".

A lift typically has a driving arm, which may drive a platform between a first position and a second position. The driving arm may comprise one or more elements connected to each other by joints.

A scissor table usually has several driving arms. In a typical embodiment, a scissor table may include four driving arms, wherein pairs of driving arms form X's, and wherein the driving arms are connected at the centres of the X's. The two X's, formed by the driving arms, are arranged to carry a platform. The platform can be driven between a first position and a second position by the angle of the driving arms being changed relative to a base.

The load-bearing capacities of extendable, load-bearing structures are dependent on the designs of the structures. A lift with only one driving arm must have a far stronger driving arm to carry the same weight as a scissor table with four driving arms. However, the scissor table, too, needs a robust structure. Such a robust structure may be heavy and therefore, in some situations, not very suitable.

SUMMARY

The invention has for its object to remedy or reduce at least one of the drawbacks of the prior art or at least provide a useful alternative to the prior art.

The object is achieved through the features that are specified in the description below and in the claims that follow.

The invention is defined by the independent claims. The dependent claims define advantageous embodiments of the invention.

In a first aspect of the present invention, an extendable, load-bearing structure has been provided, wherein:
   an extent of the extendable, load-bearing structure is arranged to be changeable in both directions between a first position, in which the extendable, load-bearing structure has a smallest extent, and a second position, in which the extendable, load-bearing structure has a largest extent;
   the extendable, load-bearing structure comprises a main structure, a driving element, a locking mechanism, and a support structure;
   the main structure comprises at least four driving arms, wherein each driving arm comprises two driving-arm elements connected to each other by a joint; and
   the driving element is placed in connection with the driving arms to drive the extendable, load-bearing structure between said positions, wherein:
   the driving arms of the main structure are parallel in pairs, wherein the driving arms of each pair of driving arms is connected by a bail extending between the joints of the driving arms;
   the supporting structure is arranged on two opposite sides of the main structure and comprises at least four supporting arms that each comprises two supporting-arm elements connected to each other by a joint;
   the supporting arms of the supporting structure are parallel in pairs, wherein the supporting arms of each pair of supporting arms is connected by a bail extending between the joints of the supporting arms;
   the supporting arms of the support structure are shorter than the driving arms of the main structure;
   the supporting-arm elements of the supporting arms substantially are in line when the extendable, load-bearing structure is in its second position;
   the locking mechanism is arranged to releasably lock the supporting-arm elements of the supporting arm in position when these are in line, such that the extendable, load-bearing structure in its second position forms a releasable, locked truss; and
   the bails that connects the supporting arms and the bails that connects the driving arms comprise the locking mechanism.

The lock mechanism may be arranged to releasably lock the supporting-arm elements of the supporting structure in position when these are in line, by each joint, connecting two supporting-arm elements belonging to a supporting arm, being arranged to lockingly engage in a releasable manner with the main structure when the load-bearing structure is in its second position, so that, in its second position, the load-bearing structure forms a truss.

The extendable, load-bearing structure will normally include four supporting arms, but it may include more than four, such as five, six or more than six supporting arms.

The extendable, load-bearing structure will normally include four driving arms, but may also include more than four, such as five, six or more than six driving arms.

The main structure of the extendable, load-bearing structure may work and look like a scissor table, but the extra supporting structure gives an obvious advantage in relation to a typical scissor table. With the supporting structure, the extendable, load-bearing structure will have a considerably better load-bearing capacity in the longitudinal direction of the supporting structure. This allows the main structure not to be as strong, and thereby not as heavy, as the structure of a scissor table in order to carry the same load.

A scissor table, as described earlier, may consist of an X-section, in which the arms that form the X are movable and in which the arms, when being moved, can lift or lower a platform. A scissor table may also consist of several X-sections, arranged in series. In that way, such a scissor table may have a larger maximum extent compared with a scissor table consisting of only one X-section. The same principle applies to the extendable, load-bearing structure according to the present invention. The extendable, load-bearing structure may consist of a single extendable section, or two or more extendable sections.

The extendable, load-bearing structure, according to the invention, may be formed from two opposite V's. Each such V consists of a driving arm, each driving arm comprising two driving-arm elements that are connected to each other by a joint. Such a V-structure will give a larger maximum extent than an X-structure in relation to the size of the area covered by the structure on a base from which it is erected; that is to say in relation to a so-called "footprint".

The extendable, load-bearing structure may be used as an extendable structure in the vertical direction, in the horizontal direction, or in any direction between the vertical and horizontal directions.

The supporting structure may include end portions. One or more of these end portions may be placed in engagement with the main structure. With such a solution, the extendable, load-bearing structure may form a truss in its second position and thereby form a very solid structure of great load-bearing capacity.

The lock mechanism may comprise a lock bail as part of the main structure and a receiving bail as part of the supporting structure. The lock bail may comprise a cylinder and a piston, and the receiving bail may include a receiving device for a piston, called a piston receiver in what follows. The lock mechanism may be arranged to place the supporting structure into releasable locking engagement with the main structure by the piston of the lock bail being driven into the piston receiver of the receiving bail when the extendable, load-bearing structure is in its second position. A lockable engagement will further increase the load-bearing capacity and the stability of the structure.

The lock bail may be provided with a spring to prevent the bail from rotating in a manner which may lead to problems in locking. For the same reason, the receiving bail may be provided with a spring. The purpose of the springs is thus to ensure that the lock bail and the receiving bail have the correct orientations relative to each other.

The lock mechanism that ensures the lockable engagement may be hydraulically operated in a manner known per se, or it may be electrically operated.

The extendable, load-bearing structure may include a guiding device for the transport of equipment. The guiding device may be formed of the supporting arms of the supporting structure. The guiding device may include a rail with a track adapted for a motorized means of conveyance to be moved between the end portions of the extendable, load-bearing structure when the extendable, load-bearing structure is in its second position; that is to say when the supporting-arm elements of each supporting arm are in line. This guiding device may be advantageous as it may facilitate the conveyance of, for example, tools to and/or from a user of the extendable, load-bearing structure.

The extendable, load-bearing structure may include a plurality of guiding devices. It may include two, three, four or more than four guiding devices. Two or more guiding devices may be arranged to be parallel to each other when the extendable, load-bearing structure is in its second position.

The extendable, load-bearing structure may further be provided with a biasing element for the supporting arms of the supporting structure to be pushed out from the main structure when the lock mechanism releases a lockable engagement between the supporting structure and the main structure. Such a biasing element has the effect of enabling the joints of the supporting structures to be displaced so that the supporting-arm elements of each supporting arm will no longer be in line when the supporting-arm elements are no longer in the locked position. This property may be advantageous when the extendable, load-bearing structure is to be driven from its most extended position.

In a second aspect, the invention relates to a method for erecting an extendable, load-bearing structure in accordance with the first aspect of the invention, the extendable, load-bearing structure having a supporting structure which, in the second position of the extendable, load-bearing structure, is brought into engagement with the main structure.

The method may further include the step of the supporting structure being locked in releasable locking engagement with the main structure when the extendable, load-bearing structure takes its second position.

BRIEF DESCRIPTION OF THE DRAWINGS

In what follows, examples of preferred embodiments will be described, which are illustrated in the accompanying drawings, in which.

DETAILED DESCRIPTION OF THE DRAWINGS

Figure 1:
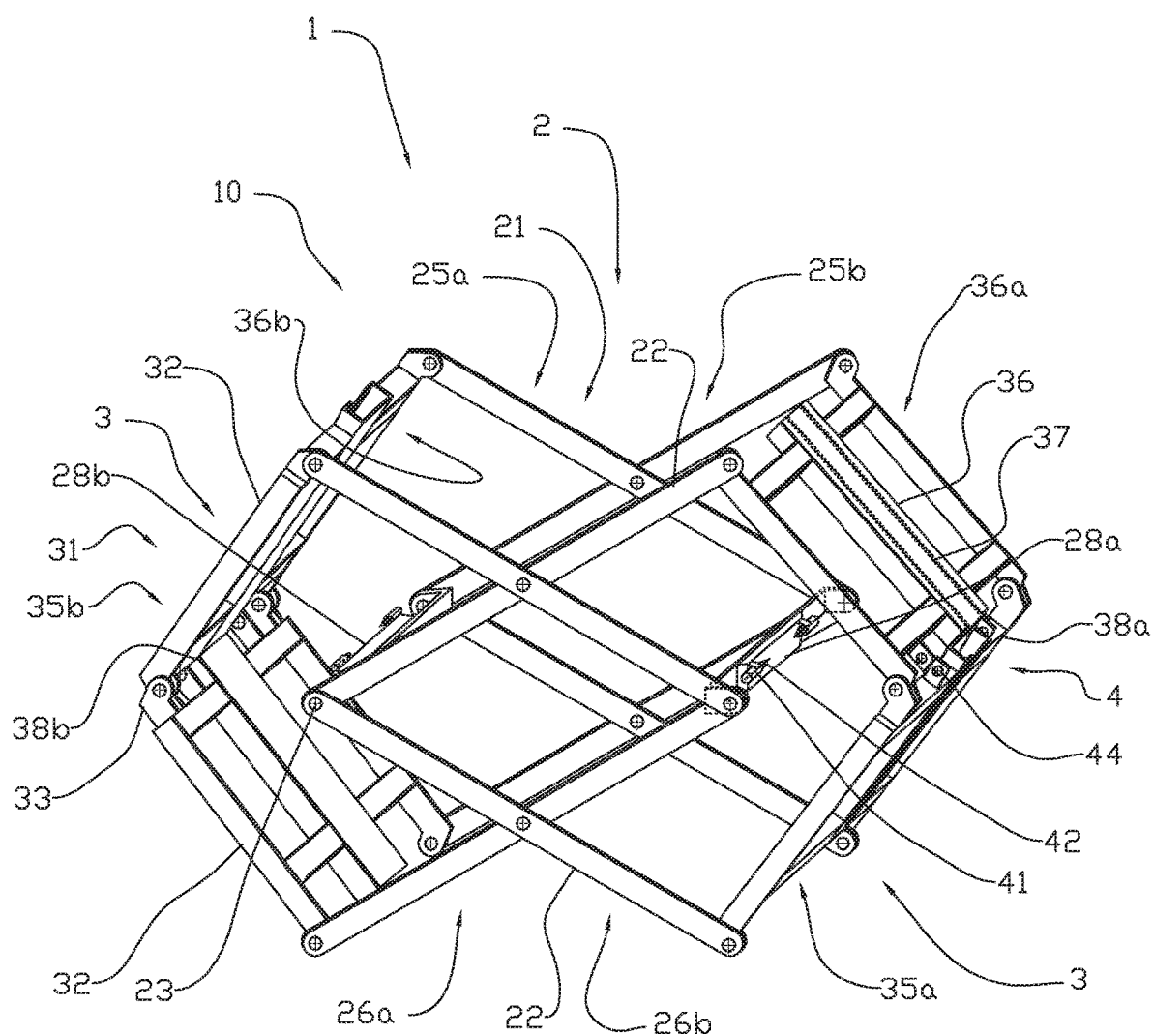
FIG. 1 shows a section of an extendable, load-bearing structure.

FIG. 1 shows an embodiment of a section 10 of an extendable, load-bearing structure 1. The extendable, load-bearing structure 1 may comprise one such section 10, or two or more such sections 10 connected in series. The figure shows how the extendable, load-bearing structure 1 is constructed from a main structure 2 including four inner V's 25a, 25b, 26a, 26b of opposite orientations in pairs. These V's 25a, 25b, 26a, 26b are each formed of a driving arm 21, each driving arm 21 being formed of two driving-arm elements 22 which are connected to each other by a joint 23. Further, the figure shows how a supporting structure 3 of the load-bearing structure 1 includes four outer V's 35a, 35b, 36a, 36b of opposite orientations in pairs, each V 35a, 35b, 36a, 36b being formed of a supporting arm 31, and each supporting arm 31 consisting of two supporting-arm elements 32 which are connected to each other by a joint 33. The supporting arms 31 are shorter than the driving arms 21 so that the supporting arms 31 will reach the extended position before the driving arms 21. In their extended positions, the supporting arms 31 will form I's as the supporting-arm elements 32 of the supporting arms 31 will be in line in their extended positions.

In the embodiment shown in FIG. 1, the extendable, load-bearing structure 1 is of such a design that the main structure 2 and the supporting structure 3 will engage with each other when the supporting-arm elements 32 of the supporting arms 31 are in line. The extendable, load-bearing structure 1 further includes a lock mechanism 4 which can be used to place the supporting structure 3 into releasable locking engagement with the main structure 2. The lock mechanism 4 includes two lock bails 28 *a*, 28 *b* and two receiving bails 38 *a*, 38 *b*. The lock bails 28 *a*, 28 *b* each include two cylinders 41 and two pistons 42, and the receiving bails 38 *a*, 38 *b* each include two piston receivers 44. The extendable, load-bearing structure 1 may further be provided with a biasing element for the supporting arms 31 of the supporting structure 3 to be pushed out from the main structure 2 when the lock mechanism 4 releases a lockable engagement between the supporting structure 3 and the main structure 2. When the extendable, load-bearing structure 1 is in its most extended position and the supporting structure 3 is in engagement with the main structure 2, the lock mechanism 4 places the supporting structure 3 in releasable locked engagement with the main structure 2 by the pistons 42 of the lock mechanism 4 being pushed into the piston receivers 44.

The driving arms 21 of the main structure 2 are parallel in pairs. The locking bails 28*a*, 28*b* form connections between the joints 23 of each pair of drive arms 21 of the main structure 2, which are parallel to each other. In the same way, the supporting arms 31 of the supporting structure 3 are parallel in pairs, with the receiving bail 38*a*, 38*b* arranged in connection between the joints 33 of each pair of supporting arms 31 of the supporting structure 31 that are parallel to each other.

Further, the supporting structure 3 of the extendable, load-bearing structure 1 includes a rail 36 with a guiding device 37, indicated here as toothings. In the figure, two such rails 36 with guiding devices 37 are shown, but it will be understood that the extendable, load-bearing structure 1 may include more than two such rails 36 with guiding devices 37, or it may include fewer than two.

Figure 2:
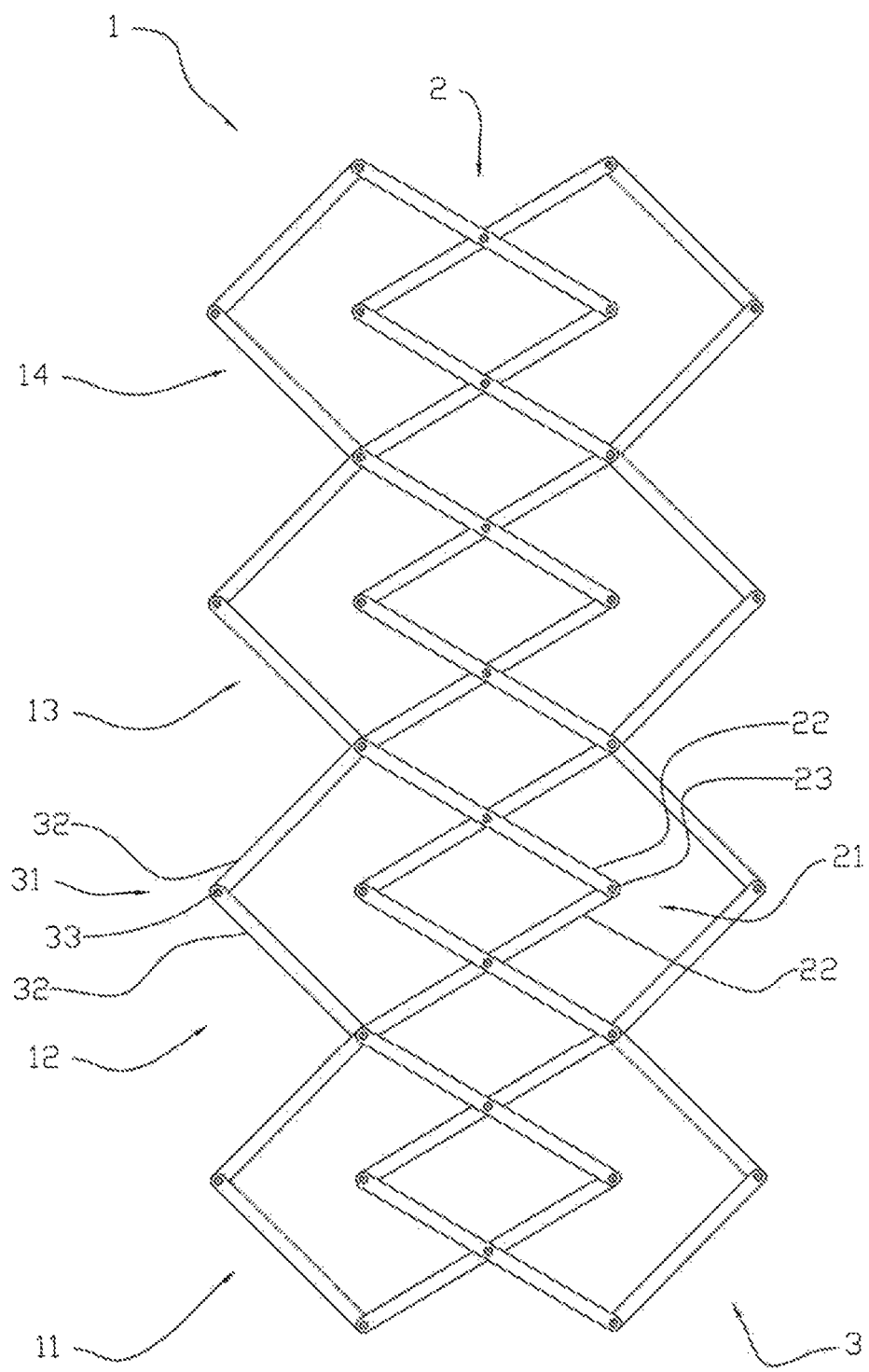
FIG. 2 shows a schematic illustration of an extendable, load-bearing structure consisting of four sections, in a position between a first position and a second position.

FIG. 2 shows a schematic illustration of the extendable, load-bearing structure 1 with four sections 11, 12, 13, 14 corresponding to the section 10 shown in FIG. 1. The extendable, load-bearing structure 1 is in a position between its smallest extent and its largest extent.

Figure 3:
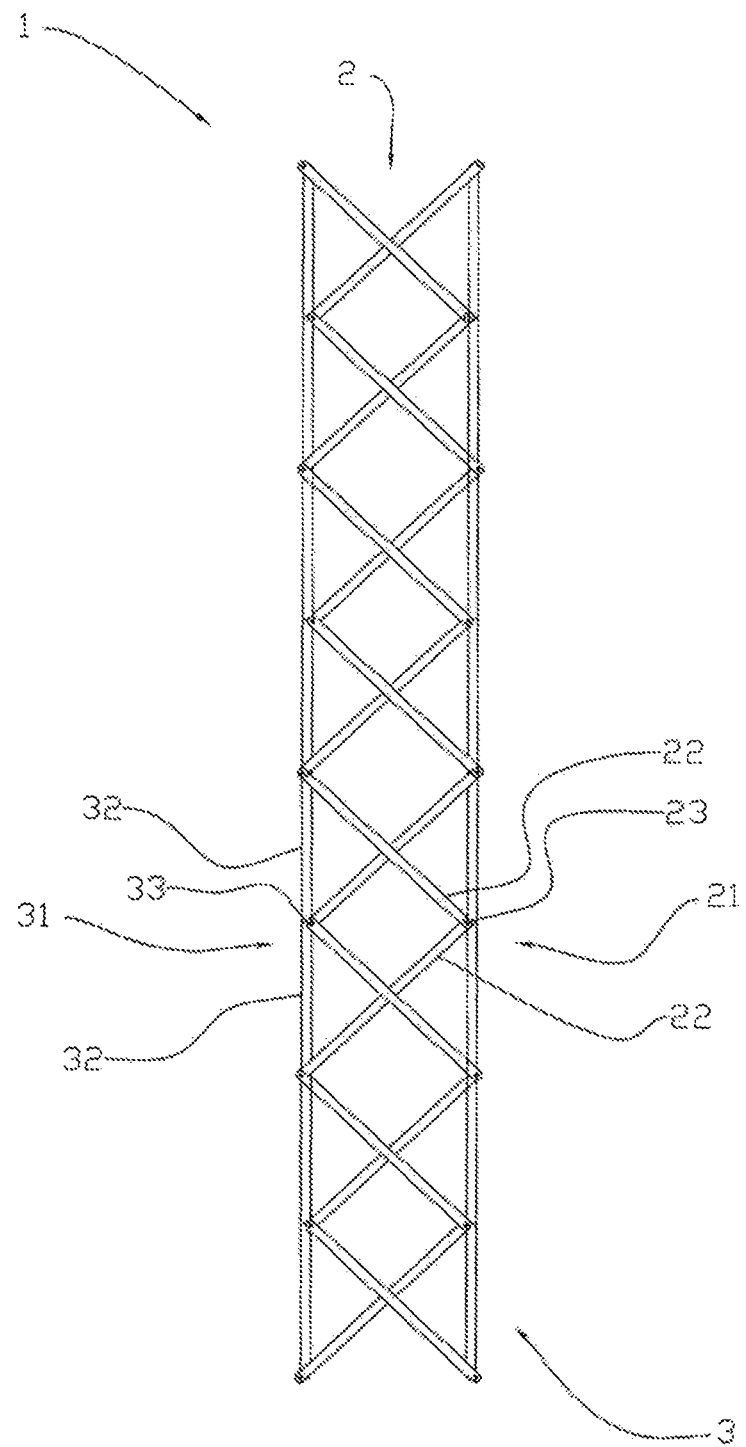
FIG. 3 shows a schematic illustration of an extendable, load-bearing structure consisting of four sections, in the extended position.

FIG. 3 shows the same as FIG. 2, but in FIG. 3 the extendable, load-bearing structure 1 is in its second position, in which the extendable, load-bearing structure has its largest extent. In FIG. 3, the supporting-arm elements 32 of the supporting arms 31 are in line in pairs, and the supporting structure 3 is in releasable locking engagement with the main structure 2. In this embodiment and in this position the extendable, load-bearing structure 1 forms a truss.

FIG. 3 shows further that each joint 33 connecting two supporting-arm elements 32 belonging to a supporting arm 31 is arranged to lockingly engage in a releasable manner with the main structure 2 when the supporting structure 1 is in its second position.

It should be noted that even though the extendable, load-bearing structure 1 is shown as a structure erected in height, "standing" that is, it will be understood that the extendable, load-bearing structure 1 may equally well be used "lying", or in any position between the standing position shown and said lying position.

Figure 4:
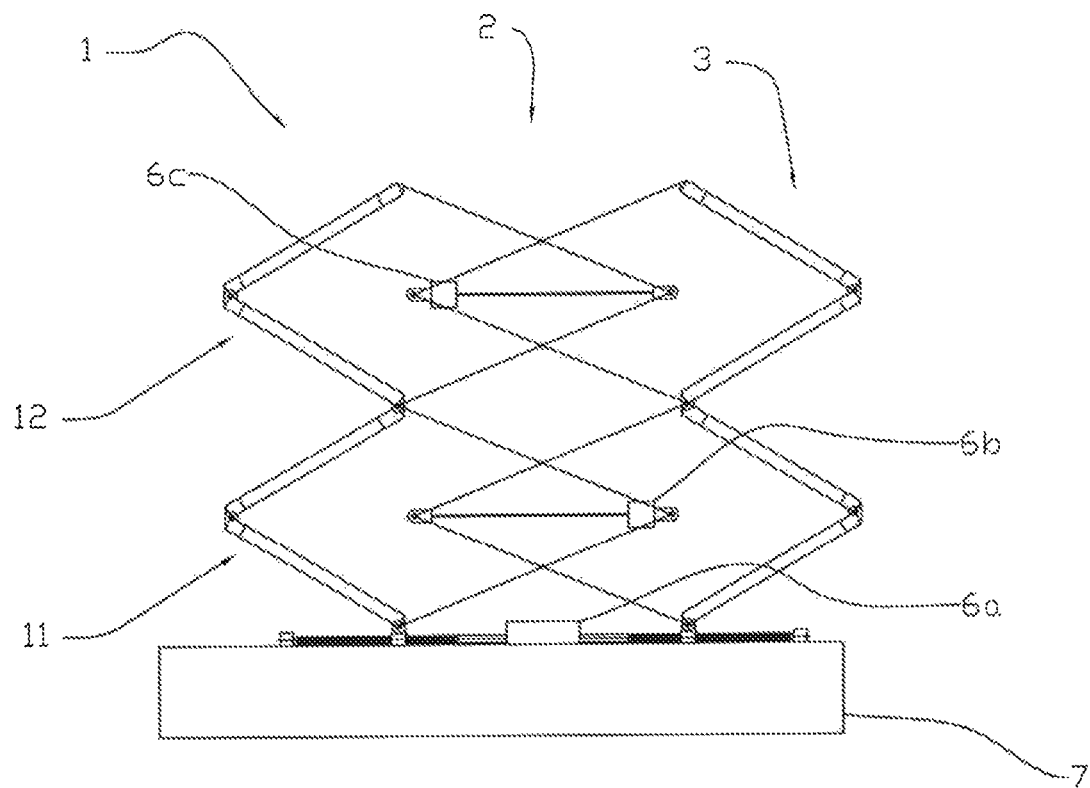
FIG. 4 shows an extendable, load-bearing structure consisting of two sections, the sections of the extendable, load-bearing structure each being provided with a driving element, and a driving element being connected to the lowermost part of the extendable, load-bearing structure.

In FIG. 4, the extendable, load-bearing structure 1 is illustrated with driving elements 6*a*, 6*b*, 6*c*. The extendable, load-bearing structure 1 is placed on a base 7 and consists of two sections 11, 12. Each section is provided with a driving element 6*b*, 6*c*. In addition, the extendable, load-bearing structure 1 is provided with a driving element 6*a* standing on the base 7 and being connected to the lowermost part of the extendable, load-bearing structure 1. The driving elements 6*a*, 6*b*, 6*c* may be one of or a combination of: electric motors, hydraulic motors, or mechanical driving elements 6*a*, 6*b*, 6*c*, for example a threaded rod.

It should be noted that even though it is indicated in simple lines, the main structure 2 shown in FIG. 4 is in principle identical to the main structure 2 shown in the preceding figures.

Figure 5:
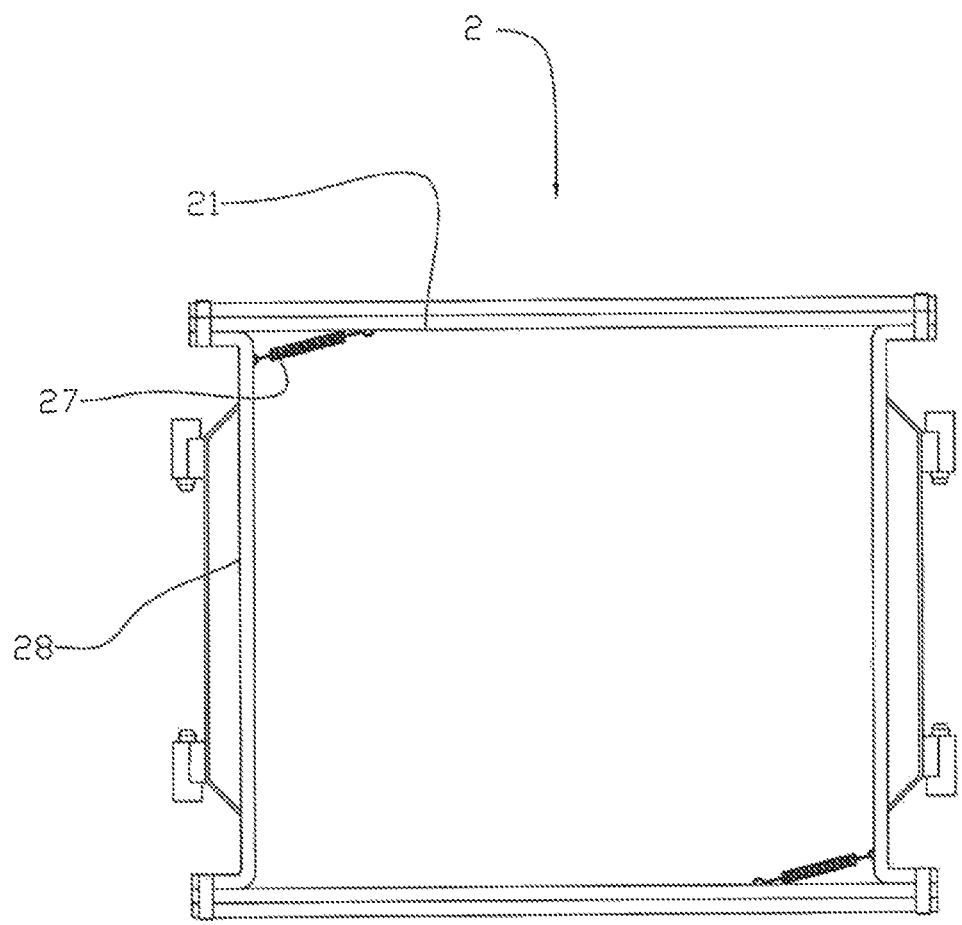
FIG. 5 shows an embodiment of the main structure of the extendable, load-bearing structure of FIG. 1, seen from above, the main structure further including a spring for holding a lock bail in position.

FIG. 5 shows only the main structure 2 of FIG. 1 seen from above, but the main structure 2 further includes a spring 27. The spring 27 connects a lock bail 28 to a driving-arm element 22. The purpose of the spring 27 is to provide for the lock bail 28 to be biased into a correct position relative to the piston receiver 44 shown in FIG. 1.

It should be noted that all the above-mentioned embodiments illustrate the invention, but do not limit it, and persons skilled in the art may construct many alternative embodiments without departing from the scope of the attached claims. In the claims, reference numbers in brackets are not to be regarded as restrictive.

The use of the verb "to comprise" and its different forms does not exclude the presence of elements or steps that are not mentioned in the claims. The indefinite article "a" or "an" before an element does not exclude the presence of several such elements.

The fact that some features are indicated in mutually different dependent claims does not indicate that a combination of these features cannot be used with advantage.

The invention claimed is:

1. An extendable load-bearing structure configured to be changeable between a first position, in which the extendable, load-bearing structure has a smallest extent, and a second position, in which the extendable, load-bearing structure has a largest extent, the extendable, load-bearing structure comprising:

a main structure, a driving element, a lock mechanism, and a supporting structure;

the main structure having at least four driving arms, wherein each driving arm has two driving-arm elements connected to each other by a joint; and the driving element being placed in connection with the driving arms to drive the extendable, load-bearing structure between said first and second positions, the driving arms of the main structure being parallel in pairs, wherein the driving arms of each pair of driving arms are connected by a bail extending between the joints of the driving arms;

the supporting structure being arranged on opposite sides of the main structure and having at least four supporting arms that each include two supporting-arm elements connected to each other by a joint;

the supporting arms of the supporting structure being parallel in pairs, wherein the supporting arms of each pair of supporting arms are connected by a bail extending between the joints of the supporting arms;

the supporting arms of the support structure being shorter than the driving arms of the main structure;

the supporting-arm elements of the supporting arms being substantially in line when the extendable, load-bearing structure is in its second position;

the lock mechanism being arranged to releasably lock the supporting-arm elements of the supporting arm in position when the supporting-arm elements are in line, such that the extendable, load-bearing structure in its second position forms a truss; and the lock mechanism comprising the bails that connect the supporting arms and the bails that connect the driving arms.

2. The extendable, load-bearing structure according to claim 1, wherein the supporting structure has end portions, and wherein one or more of the end portions of the supporting structure are placed in engagement with the main structure.

3. The extendable, load-bearing structure according to claim 1, wherein:

the bail extending between the joints of the driving arms is a lock bail;

the bail extending between the joints of the supporting arms is a receiving bail;

the lock bail has a cylinder and a piston;

the receiving bail has a receiving device for the piston, and the lock mechanism is arranged to place the supporting structure into releasable locking engagement with the main structure when the extendable, load-bearing structure is in its second position.

4. The extendable, load-bearing structure according to claim 1, wherein the lock mechanism is electrically operated or hydraulically operated.

5. The extendable, load-bearing structure according to claim 1, wherein the extendable, load-bearing structure has a guiding device for the transport of equipment.

6. The extendable, load-bearing structure according to claim 5, wherein the guiding device is formed on and supported by the supporting arms of the supporting structure.

7. A method for erecting an extendable, load-bearing structure arranged configured to be changeable in both directions between a first position, in which the extendable, load-bearing structure has a smallest extent, and a second position, in which the extendable, load-bearing structure has a largest extent;

the extendable, load-bearing structure comprising a main structure, a driving element, a lock mechanism, and a supporting structure;

the main structure having at least four driving arms, wherein each driving arm includes has two driving-arm elements connected to each other by a joint; and the driving element is being placed in connection with the driving arms to drive the extendable, load-bearing structure between said first and second positions, characterized in that the driving arms of the main structure are arranged in parallel in pairs, wherein the driving arms of each pair of driving arms is are connected by a bail extending between the joints of the driving arms;

the supporting structure is arranged on opposite sides of the main structure and includes at least four supporting arms that each include two supporting-arm elements connected to each other by a joint;

the supporting arms of the supporting structure are arranged in parallel in pairs, wherein the supporting arms of each pair of supporting arms are connected by a bail extending between the joints of the supporting arms;

the supporting arms of the support structure are being shorter than the driving arms of the main structure;

the supporting-arm elements of the supporting arms being substantially in line when the extendable, load-bearing structure is in its second position;

the lock mechanism is arranged to releasably lock the supporting-arm elements of the supporting arm in position when the supporting-arm elements are in line, such that the extendable, load-bearing structure in its second position forms a truss; and the lock mechanism comprises the bails that connect the supporting arms and the bails that connect the driving arms;

the method comprising:

bringing the supporting structure of the extendable, load-bearing structure, in the second position of the extendable, load-bearing structure, into engagement with the main structure.

8. The method according to claim 7, further comprising placing the supporting structure into releasable locking engagement with the main structure in the second position of the extendable, load-bearing structure.

9. The extendable, load-bearing structure according to claim 2, wherein:

the bail extending between the joints of the driving arms is a lock bail;

the bail extending between the joints of the supporting arms is a receiving bail;

the lock bail has a cylinder and a piston;

the receiving bail has a receiving device for the piston, and the lock mechanism is arranged to place the supporting structure into releasable locking engagement with the main structure when the extendable, load-bearing structure is in its second position.

* * * * *